United States Patent [19]

Lettvin

[11] Patent Number: 5,559,960
[45] Date of Patent: Sep. 24, 1996

[54] SOFTWARE ANTI-VIRUS FACILITY

[76] Inventor: Jonathan D. Lettvin, 194 Waltham St., Lexington, Mass. 02173

[21] Appl. No.: 426,943

[22] Filed: Apr. 21, 1995

[51] Int. Cl.$^6$ .................................................. G06F 11/34
[52] U.S. Cl. ................................................ 395/186; 380/4
[58] Field of Search ............................ 395/186, 185.01; 364/286.4, 286.5; 380/4, 25

[56] References Cited

U.S. PATENT DOCUMENTS

| | | | |
|---|---|---|---|
| 5,086,502 | 2/1992 | Malcolm | 364/200 |
| 5,144,660 | 9/1992 | Rose | 380/4 |
| 5,359,659 | 10/1994 | Rosenthal | 380/4 |
| 5,398,196 | 3/1995 | Chambers | 364/580 |
| 5,414,833 | 5/1995 | Hershey et al. | 380/4 |
| 5,421,006 | 5/1995 | Jablon et al. | 380/4 |
| 5,440,723 | 8/1995 | Arnold et al. | 395/181 |
| 5,483,649 | 1/1996 | Kuznetsov et al. | 395/186 |

OTHER PUBLICATIONS

Hitech Business Software Inc. "Super Masteer, User's Manual", selected section in chapter 3 and 7."

Primary Examiner—Robert W. Beausoliel, Jr.
Assistant Examiner—Albert Dećcady
Attorney, Agent, or Firm—Cesari and McKenna

[57] ABSTRACT

A virus-resistant disk has a "hidden partition" in which anti-virus software is stored; the hidden partition not only shields the software from many viruses, but provides storage space that does not reduce the disk's formatted or advertised capacity. The disk includes software to cause the computer to execute the anti-virus software. The invention provides a hidden partition by utilizing storage space on the disk that is not reflected in the size and geometry information stored on the disk, e.g., in the BIOS Parameter Block.

16 Claims, 3 Drawing Sheets

SOFTWARE ANTI-VIRUS FACILITY

COPYRIGHT NOTICE

A portion of the disclosure of this patent contains material which is subject to copyright protection. The copyright owner has no objection to the facsimile reproduction by anyone of the patent document of the patent disclosure, as it appears in the Patent and Trademark Office patent file or records, but otherwise reserve all copyright rights whatsoever.

FIELD OF THE INVENTION

The invention relates to detecting, identifying and removing computer viruses from components of a computer, and more particularly to a startup (bootstrap) disk that stores anti-virus software and facilitates the execution of this software at bootstrap time, i.e., before the computer begins executing an ultimate operating system (e.g., MS-DOS).

BACKGROUND OF THE INVENTION

A computer virus is software that is executed by a computer without the knowledge or authorization of the computer's user and that causes unauthorized and unwanted changes to components of the computer or to information stored on the computer. For example, some viruses alter or destroy data stored on disk, scramble characters on video display screens, display misleading messages to users, and consume computer or network resources thereby preventing users from performing desired tasks. A virus usually attempts to propagate itself to other computers by making copies of itself on any accessible diskettes or hard disks (collectively "disks") or other non-volatile memory such as "flash" read-only memory (ROM). A virus "attack" herein means any change made to a computer component by a virus, such as a change to stored information or the making of a propagation copy of the virus.

Viruses typically propagate by opportunistically copying themselves to ("infecting") any disks that happen to be accessible when a computer executes the virus. If a user transports an infected disk to a second computer and the second computer executes the virus, the virus then attempts to infect disks on the second computer, and so on. Viruses generally employ one of two techniques to cause a subsequent execution of themselves. Some viruses attach themselves to application programs that are stored on a disk. When a user runs the infected program, the virus also executes. Most viruses, however, are "bootstrap-time viruses" that replace the startup (bootstrap) program located on the infected disk with a program that causes the computer to execute the virus if the disk is subsequently used as a startup disk on this or another computer. Once the virus executes, it arranges for itself to remain in the memory of the computer after bootstrap, but causes the computer to execute the normal bootstrap program so as to mask its presence. Following completion of bootstrap, the virus remains stored on the computer and capable of causing further mischief.

Bootstrap programs execute as part of a bootstrap sequence initiated by the application of power or a reset signal to a computer. During this sequence, the computer performs a power-on self-test ("POST"), then locates a bootstrap program on a disk and then executes the bootstrap program. The bootstrap program is always stored at a characteristic, fixed location (the "boot block") on the disk. Generally, the bootstrap program readies the computer for normal functioning by causing it to load and execute an operating system, such as MS-DOS, OS/2, NetWare, UNIX, or Windows-NT, although the bootstrap program can also cause the computer to execute one or more other programs prior to executing the operating system. Accordingly, as used herein, the term "bootstrap" includes the time and steps taken between the application of power or reset signal and the execution of the last program prior to the operating system; and "operating system" is software that manages a computer's resources (e.g., disks and memory) and provides low-level services (e.g., I/O, timer, memory management, interprogram communication) to application programs. An "application program" is not part of an operating system and can only execute under the control of an operating system.

To overcome the problems created by viruses, practitioners have developed a variety of "anti-virus" programs that both detect and remove known viruses. Anti-virus software searches for "signatures", including characteristic behaviors, of viruses and removes any found viruses. Examples of commercially available anti-virus programs include Command Software Systems F-PROT, IBM AntiVirus, and Sophos Sweep. However, and quite problematically, bootstrap-time viruses can interfere with the operation of prior art anti-virus software. In addition, the presence of an operating system can obscure the presence of a virus in the memory of a computer.

As noted previously, a bootstrap program is stored at a characteristic disk location or address. For "addressing" purposes, disks are divided into surfaces, tracks, and sectors. The "formatted capacity", in bytes, of a disk (also known as the "advertised capacity") equals the product of the number of: surfaces, tracks per surface, sectors per track, and bytes per sector of the disk. A hard disk can be further o divided into one or more logical "partitions", each partition being treated as a separate disk. Generally, the first sector of a diskette and the first sector of each partition of a hard disk contains a disk descriptor block which contains size and geometry information about the disk, such as the number of sectors per track. "BIOS Parameter Block" herein refers to the area on the disk where this information is characteristically stored. The following Table 1 lists the relevant fields of the BIOS Parameter Block. "Conventional storage capacity" of a disk herein means the formatted capacity of the disk as reflected by information in the BIOS Parameter Block of the disk.

TABLE 1

Selected Fields of the BIOS Parameter Block

| Size (bytes) | Field |
|---|---|
| 2 | Number of bytes per sector |
| 2 | Total number of sectors in volume (logical partition) |
| 2 | Number of sectors per track |
| 2 | Number of surfaces (heads) |
| 2 | Number of entries in root directory |

It is therefore an objective of the invention to provide a startup disk (diskette or hard disk) that causes the computer to automatically execute anti-virus software each time the computer starts from the disk, i.e., during bootstrap, so as to detect bootstrap-time viruses before or after they have executed and implanted themselves in the system.

It is a further objective to provide a disk that stores the anti-virus software without reducing the amount of conventional storage capacity on the disk.

It is a further objective to provide a disk that stores the anti-virus software so as to make it inaccessible to many viruses.

It is a further objective to provide a mechanism to detect and repair virus-inflicted damage to the anti-virus software.

It is a yet further objective to provide a virus-tolerant disk (startup and other disk) that can withstand an attack by a virus without incurring damage to information stored on the disk.

Other objectives will, in part, be obvious and will, in part, appear hereinafter. The invention accordingly comprises an article of manufacture possessing the features and properties exemplified in the constructions described herein and the several steps and the relation of one or more of such steps with respect to the others and the apparatus embodying the features of construction, combination of elements and the arrangement of parts which are adapted to effect such steps, all as exemplified in the following detailed description, and the scope of the invention will be indicated in the claims.

SUMMARY OF THE INVENTION

The invention provides a virus-resistant disk on which is stored anti-virus software and software to cause a computer to execute the anti-virus software whenever the disk is used to start the computer.

Alternatively, the invention provides a virus-resistant disk having a "hidden partition" in which the anti-virus software is stored; the hidden partition not only shields the software from many viruses, but provides storage space that does not reduce the disk's formatted or advertised capacity. The disk also includes software to cause the computer to execute the anti-virus software. The invention provides a hidden partition by utilizing storage space on the disk that is not reflected in the size and geometry information stored on the disk, e.g., in the BIOS Parameter Block. Heretofore, no reason existed for a virus to assume storage space existed on a disk beyond that reflected by the BIOS Parameter Block or to access such space because the BIOS Parameter Block is the standard mechanism for identifying the configuration and storage capacity of a disk.

A "conventional program" herein means a program that either relies on the accuracy of the BIOS Parameter Block to access the disk or accesses the disk via an operating system that so relies. Most viruses are conventional programs. Advantageously, the invention utilizes the hidden partition to make programs and information stored in the hidden partition inaccessible to most existing viruses. In addition, storing programs and information in the hidden partition does not reduce the amount of available space on the disk, as reflected by the BIOS Parameter Block.

The invention provides the hidden partition by taking advantage of unutilized storage capacity on the disk. For example, diskettes commonly have gaps between the sectors of a track. The invention provides a diskette in which at least some of the gaps have been reduced in size, thereby bringing closer together the sectors of the track and leaving enough room for one or more additional sectors on the track. Not all tracks need have the same number of additional sectors. The additional sectors on all the tracks collectively form the hidden partition. Information in the BIOS Parameter Block does not reflect the existence of the additional sectors.

Hard disks generally have unutilized storage capacity in the form of spare sectors and/or spare tracks, the existence of which is not reflected by information in the BIOS Parameter Block. A hard disk lacking such spares generally can be formatted to contain them.

The invention provides a disk on which a special bootstrap program is stored in the boot block and, if the disk is a startup disk, the normal bootstrap program is stored elsewhere on the disk. The special bootstrap program causes the computer to execute the anti-virus software stored in the hidden partition and then, upon completion of the anti-virus software and if the disk is a startup disk, to execute the normal bootstrap program, which causes the computer to execute the operating system. A source listing of an example special bootstrap program appears later in this specification.

Alternatively, the disk also contains a bootstrap-time operating system ("BTOS") and the special bootstrap program causes the computer to execute the BTOS. The BTOS causes the computer to execute one or more anti-virus, disk-maintenance (described below), and/or other programs stored in the hidden partition and then, upon completion of the programs and if the disk is a startup disk, to execute the normal bootstrap program. The normal bootstrap program causes the computer to perform an otherwise-normal startup, including executing the operating system (e.g., MS-DOS) with which the user can interact and which provides services to application programs. The operating system invoked by the normal bootstrap program is herein referred to as the "ultimate operating system" to distinguish it from the BTOS. "Post-bootstrap" herein means the time and steps taken after execution of the normal bootstrap program.

The BTOS facilitates the development and use of programs that must be executed before an ultimate operating system is executed. Executing before the ultimate operating system provides advantages to anti-virus software because the software can take advantage of conditions within the computer that only exist during bootstrap and do not exist after the computer begins executing the ultimate operating system. For example, an "interrupt vector" contains the address of a routine that is associated with the vector and that handles requests for service from a program or device. Whenever the program or device (e.g., a hard disk) requests service ("generates an interrupt"), the computer uses the address in the vector to pass control to the service routine. During bootstrap, the disk vector initially points to a well-known routine within the Basic Input/Output System (BIOS), but the ultimate operating system changes the vector to point to a routine within itself. Many viruses modify the disk vector to point to themselves, but it is difficult for an anti-virus application program to distinguish a disk vector that points to a virus from one that points to a routine within an ultimate operating system; thus it is easier for anti-virus software to detect the presence of a virus by examining the disk vector before the computer begins executing an ultimate operating system. The BTOS provides additional advantages in that developers of programs that must be executed before an ultimate operating system are relieved of developing special mechanisms that alter normal startup operations in order to invoke the programs; in addition, the BTOS provides low-level services to the programs and so simplifies them, and relieves users from concerning themselves with the details of invoking potentially several bootstrap-time programs.

Software that accesses the hidden partition is written with the knowledge that the additional sectors exist. The software accesses the additional sectors via program calls to the BIOS or BTOS rather than to the ultimate operating system because the BIOS and BTOS allow access to arbitrary addresses on the disk regardless of the contents of the BIOS Parameter Block and the ultimate operating system does not.

Alternatively, the disk also contains an application program that causes the computer to execute the anti-virus, disk-maintenance and/or other software that is stored in the hidden partition. This application program is not a conventional program because it is capable of accessing the hidden partition without relying on the BIOS Parameter Block or using an operating system that so relies. Such a program allows the user to run the anti-virus software even if a virus has attacked the special startup program and thereby prevented execution of the anti-virus software at bootstrap time. The anti-virus program examines the special startup program located in the boot block and repairs any damage done to it so it will function properly on subsequent bootstraps.

In case a virus attacks a disk having the anti-virus capabilities described above, the invention enables the disk to withstand the attack without incurring damage to files stored on the disk. The invention provides a virus-tolerant disk that prevents an operating system from placing files in sectors that are known to be attacked by several viruses, thereby shielding the files from attack by the viruses. An operating system uses a file system to manage storage space on a disk and create, delete, catalog and facilitate access to files on the disk. Storage space on a disk is allocated in units of "clusters" (contiguous groups of sectors). All clusters on a disk contain the same number of sectors and each cluster has a "cluster number" and a corresponding entry in a file system allocation table, e.g., the File Allocation Table or "FAT" in MS-DOS. The file system "chains" together clusters to allocate space to a file. Each FAT entry records whether the corresponding cluster is available, bad, or in use by a file. If it is in use, the entry contains the cluster number of the next cluster in the chain for the file or, if it is the last cluster of the file, a "last-cluster" flag. The following Table 2 lists the relevant field of a FAT entry. A "directory" catalogs files stored on a disk. For each file, a directory stores the file's attributes, e.g., read-only, and correlates the file's name and extension to its first cluster number. Directories can be organized into a hierarchy starting at a "root" directory. The following Table 3 lists the relevant fields of a directory entry. Disk-maintenance software, such as CHKDSK, SCANDISK and SpinRite, uses well-known techniques to detect and repair damage to information, such as the FAT and directory, stored by the file system and to overcome recording errors, such as signals that are recorded off-center on a track. The invention provides a disk having entries in its file system allocation table that prevent the allocation to any file of sectors that are known to be attacked by viruses. For example, the entries can mark the sectors as being "bad" or already in use.

TABLE 2

Selected Field of a FAT (File Allocation Table) Entry

| Size | Field |
| --- | --- |
| 3 nibbles (for 12-bit FAT) 2 bytes (for 16-bit FAT) 4 bytes (for 32-bit FAT) | Next cluster number or flag |

TABLE 3

Selected Fields of a Directory Entry

| Size (bytes) | Field |
| --- | --- |
| 8 | File Name |
| 3 | File Extension |
| 1 | File Attributes (e.g. read-only) |
| 2 (4 for 32-bit FAT) | First Cluster Number |

BRIEF DESCRIPTION OF THE DRAWINGS

The foregoing discussion will be understood more readily from the following detailed description of the invention, when taken in conjunction with the accompanying drawings, in which.

DESCRIPTION OF THE PREFERRED EMBODIMENT

Figure 1:
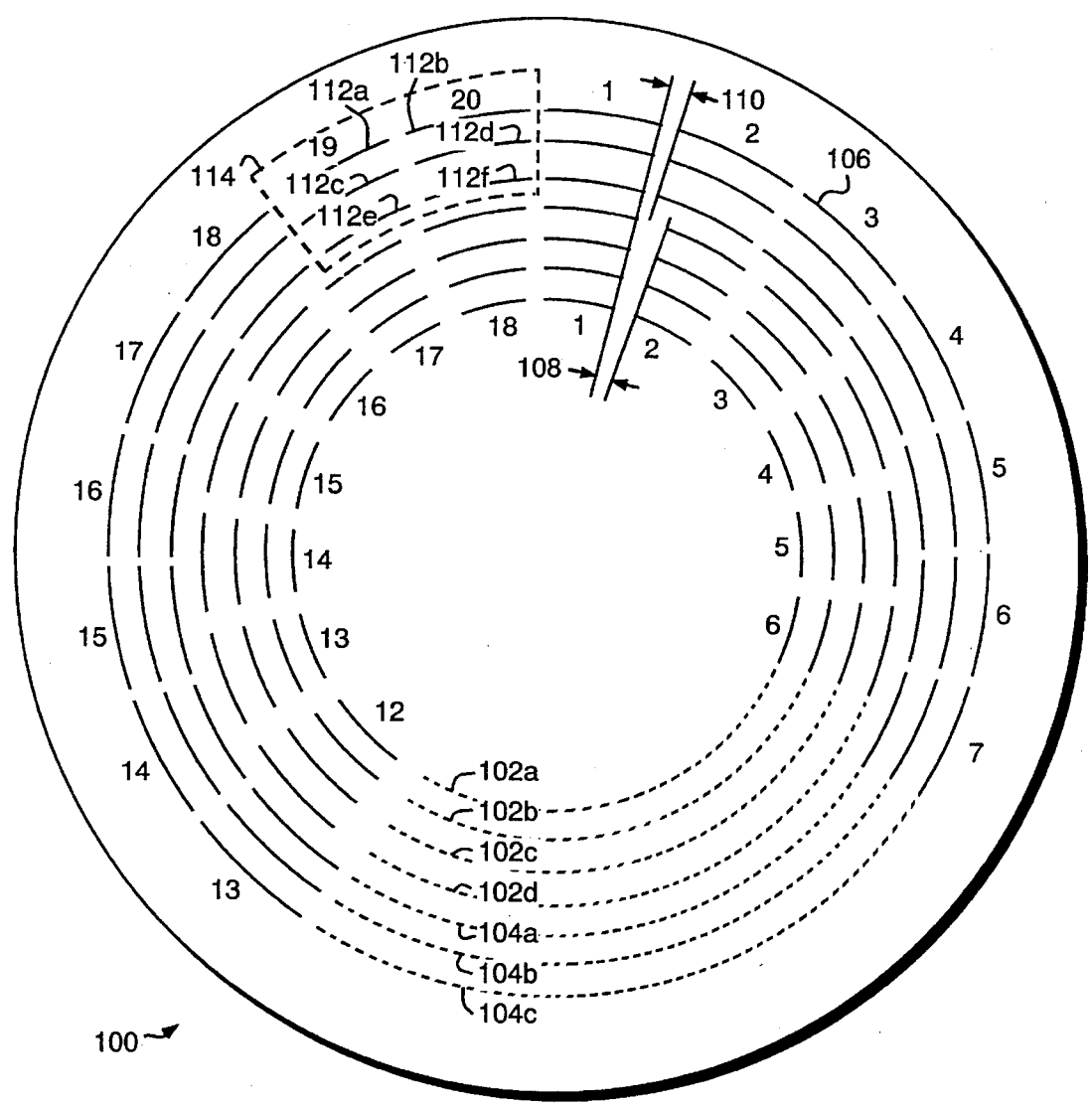
FIG. 1 is a diagram of the sectors of one surface of a diskette that has a hidden partition according to the invention.

FIG. 1 shows generally at 100 a surface of a diskette according to the invention, with representative tracks 102a–d and 104a–c. Each track has sectors, such as sector 106. On a prior art high-density 1.44 MB (formatted capacity) diskette, each track contains 18 sectors (numbered 1–18). Tracks 102a–d each contain 18 sectors, as in the prior art. As a diskette spins, the gaps between sectors provide an opportunity for circuitry within the diskette drive to synchronize itself with the carrier and data signals recorded on the diskette. The size of the gap between the sectors of tracks 102a–d is represented by angle 108. The size of the gap, represented by angle 110, between the sectors of tracks 104a–c is smaller than the size of the gap 108 between the sectors of tracks 102a–d, leaving room for, preferably, two additional sectors per track without negatively impacting the ability of the circuitry to synchronize itself. The gap can be further reduced, leaving room for three additional sectors per track, but with current technology such small gaps negatively impact the ability of the circuitry to synchronize itself. The additional sectors in track 104c are sector number "19" (112a in FIG. 1) and sector number "20" (112b in FIG. 1). Collectively, all the additional sectors on the diskette, such as sectors 112a–f, make up the hidden partition 114. (FIG. 1 assumes that only tracks 104a–c have additional sectors.)

Not all tracks need contain additional sectors, thus making it difficult for a virus to detect the existence of the hidden partition 114 and the location of the tracks 104a–c that contain additional sectors. The manufacturer of diskettes can vary, from diskette to diskette, which tracks have additional sectors. Preferably, all tracks contain two additional sectors, providing a total of 160 KB in the hidden partition of an 80-track diskette. Advantageously, these two additional sectors at the end of each track provide a rotational delay between the last conventional sector (e.g., sector number "18") of a track and the first sector of the next track. This delay allows the diskette drive enough time to reposition the head on the next track before the first sector of the next track passes under the head, thereby speeding up access to data on the diskette. Without this delay, the first sector of the next track would pass under the head before the diskette drive could reposition the head and, once the drive repositions the head, the drive would incur a time penalty of nearly one revolution before it could read the first sector in the next track.

Table 1 lists the fields of the BIOS Parameter Block that are relevant to the invention. The BIOS Parameter Block located on diskette contains the value "18" in the "Number of sectors per track" field. The "Total number of sectors in volume (logical partition)" field contains the product of 18, the number of tracks per surface and the number of surfaces on the diskette. Thus, the BIOS Parameter Block located on the diskette hides the additional sectors 112a–f, therefore making the hidden partition 114 inaccessible to conventional programs.

Figure 2:
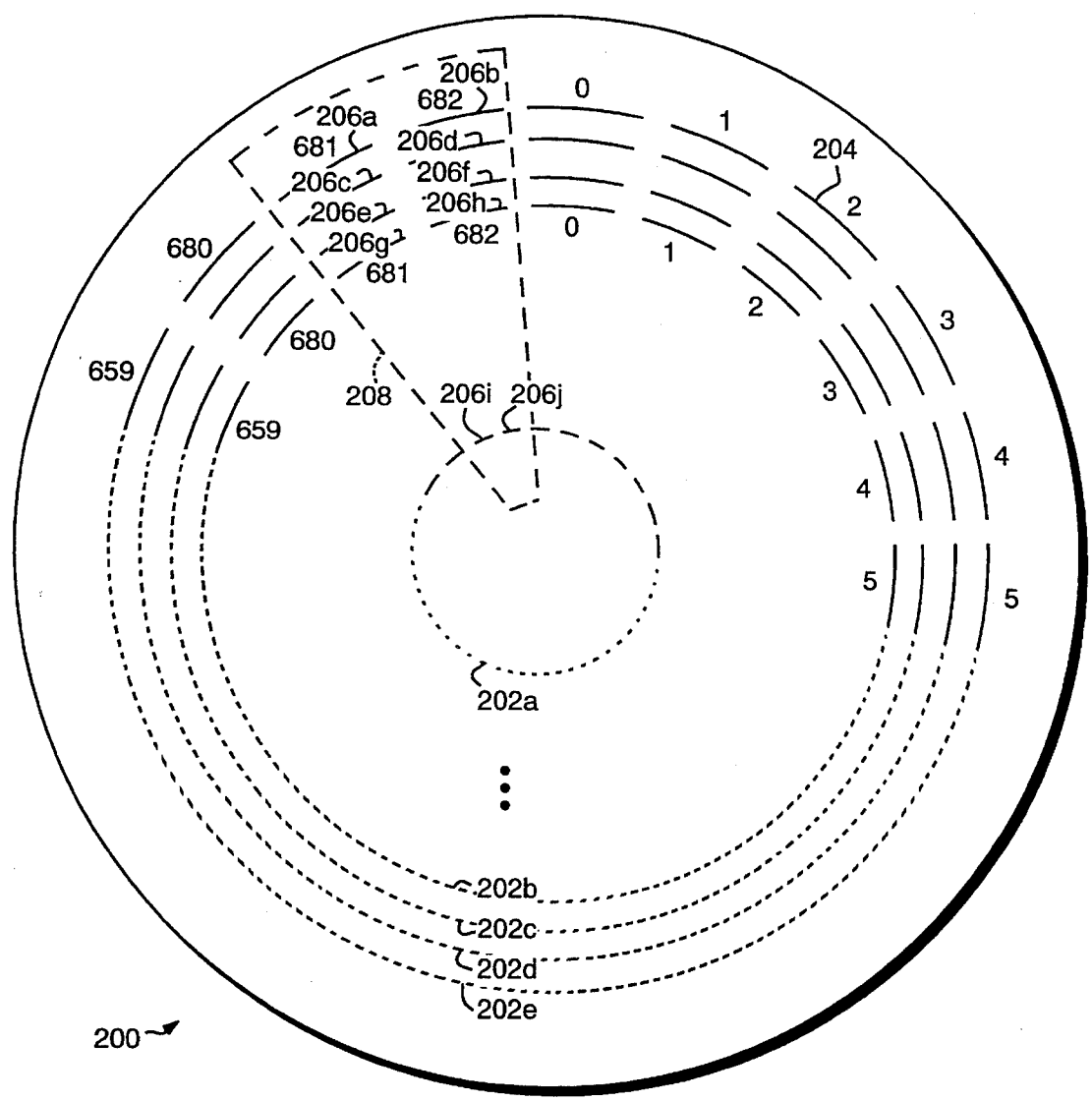
FIG. 2 is a diagram of the sectors of one surface of a hard disk having a hidden partition according to the invention.

FIG. 2 shows generally at 200 a surface of a hard disk according to the invention, including representative tracks 202a–e and representative sectors, such as sector 204. If the hard disk does not have spare sectors and/or spare tracks, or if it is not desirable to utilize these spares to form a hidden partition, the hard disk can be formatted so that the BIOS Parameter Block on the disk does not reflect the existence of selected sectors. For example, by reducing the "Number of sectors per track" field in the BIOS Parameter Block by two and reducing the "Total number of sectors in volume (logical partition)" field by the product of two, the number of tracks per surface and the number of surfaces on the disk, sector number "681" and sector number "682" in each track 202a–e, i.e., sectors 206a–j, become part of the hidden partition 208, and therefore inaccessible to conventional programs. However, I prefer to create a hidden partition on the last sectors of a disk by simply reducing the "Total number of sectors in volume (logical partition)" field in the BIOS Parameter Block because this enables the creation of a hidden partition of arbitrary size.

Figure 3:
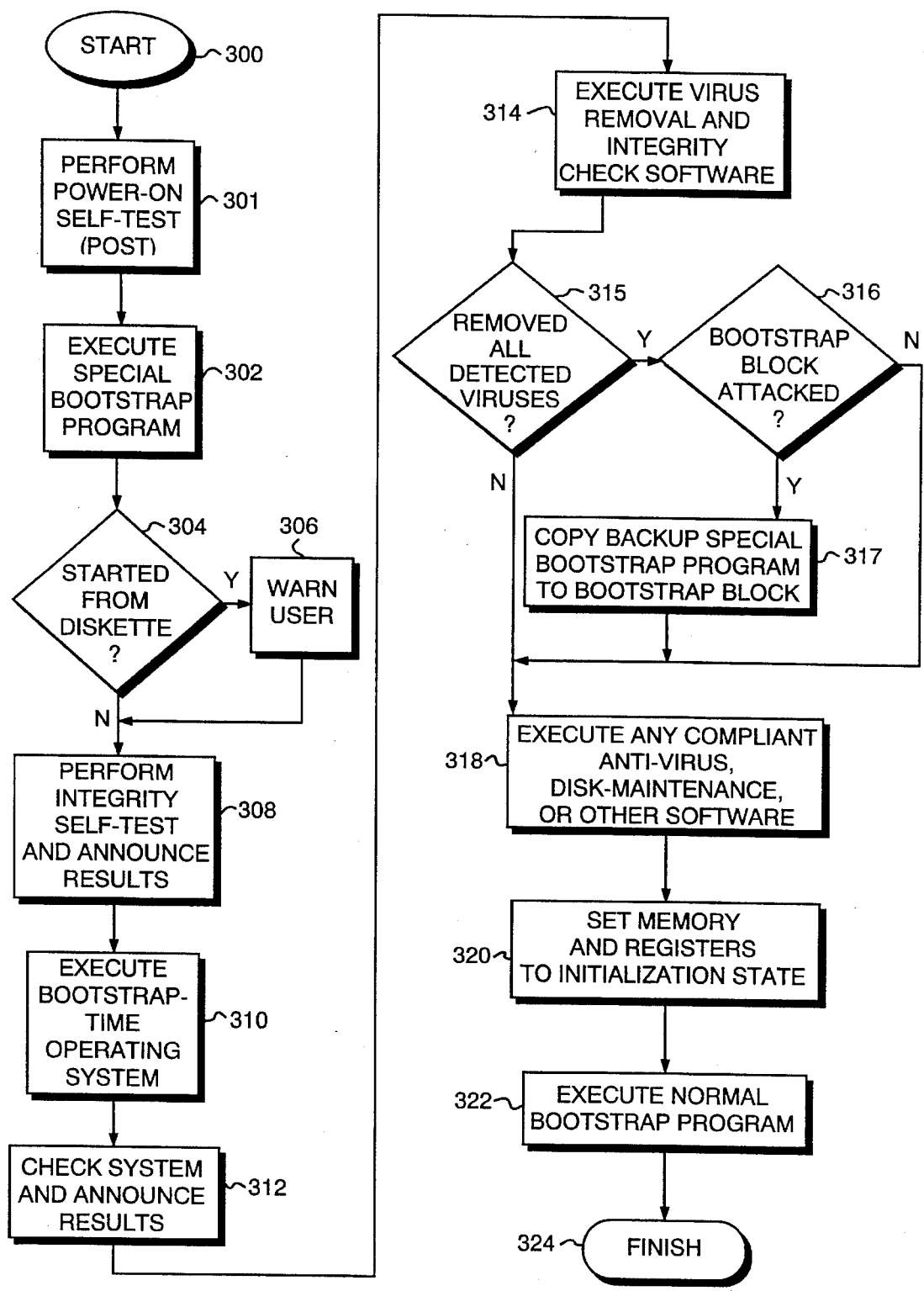
FIG. 3 is a flowchart illustrating a bootstrap sequence involving a disk provided by the invention.

FIG. 3 is a flowchart illustrating a bootstrap sequence involving a disk provided by the invention. Upon application of power or a reset signal, the computer starts at step 300 performs a power-on self-test ("POST") at step 301 and executes the special bootstrap program at step 302.

At decision step 304, the special bootstrap program ascertains whether the computer was started from a diskette or from a hard disk. If the computer was started from a diskette, at step 306 the special startup program warns the user of the risk of propagating a virus inherent in starting the computer from a diskette. The risk exists because a diskette that was previously inserted in another computer may have been infected by a virus running on the other computer, even if the diskette was not used to start the other computer.

At step 308 the special startup program performs an integrity test on itself to ascertain whether it has been damaged, e.g., by a virus attack, and announces the results of the self-test.

At step 310 the special startup program causes the computer to execute the BTOS, which is stored in the hidden partition 114 or 208. At step 312 the BTOS checks for indication of the existence of viruses in the computer and announces the results of the check. For example, the BTOS examines the disk vector, as described earlier. At step 314 the BTOS then causes the computer to load and execute virus removal and integrity check software, which is stored in the hidden partition 114 or 208.

At decision step 315, if all detected viruses have been removed, the software checks at decision step 316 whether the special bootstrap program in the boot block had been attacked. If so, at step 317 the software copies one of several backup copies of the special bootstrap program, which are stored in the hidden partition 114 or 208, to the boot block.

In addition to being capable of detecting the existence of viruses in the computer, the BTOS is an operating system and can provide services to application programs ("compliant programs") written to make program calls to it. At step 318 the BTOS causes the computer to search the hidden partition for compliant programs, such as third-party anti-virus, disk-maintenance or other software, and to load and execute any such programs it finds. Alternatively, the BTOS can search for compliant programs on portions of the disk in addition to the hidden partition, but I prefer to store all such software on the hidden partition so it does not reduce the conventional storage capacity of the disk and to make it inaccessible to conventional viruses.

At step 320 the BTOS restores the memory and registers of the computer to an "initialization" state, i.e., substantially the state that existed immediately after the POST. This state is well known, particularly to practitioners who write BIOS programs, and the step is necessary to enable the normal bootstrap program to execute correctly. For example, when a virus modifies the disk vector, the virus stores within itself the original contents of the vector so the virus can pass control to the disk handling routine after performing its mischief. When the anti-virus software detects such a modified vector, it examines the virus, retrieves the original contents of the vector and restores the vector's original contents. The location at which a virus stores the original contents can be ascertained by "disassembling" the virus. Disassembly is a well-known process of converting object code to source code.

As a second example, the anti-virus software recovers memory utilized by a virus when it removes the virus. Viruses often mask their presence by reducing the apparent amount of memory on the computer by an amount equal to their size (including buffers, etc.), e.g., by reducing a field in the BIOS Data Area that contains the number of kilobytes of memory that exist below memory address 640KB. Generally, an ultimate operating system examines the BIOS Data Area when it begins executing and configures itself accordingly. Application program anti-virus software removes a virus after the ultimate operating system begins executing, thus after the ultimate operating system has examined the BIOS Data Area, so despite having removed the virus the application program anti-virus software does not enable the ultimate operating system to utilize the memory previously utilized by the virus. Anti-virus software provided by the invention executes before the ultimate operating system so, after removing a virus, it increases the field in the BIOS Data Area by the amount of memory recovered, thereby enabling the ultimate operating system to utilize the recovered memory.

At step 322 the BTOS causes the computer to execute the normal bootstrap program and then finishes at step 324. The normal bootstrap program causes the computer to execute the ultimate operating system.

Several viruses are known to attack certain sectors and certain clusters of a disk. In case a virus attacks a disk having the anti-virus capabilities just described, these sectors and clusters are preferably allocated to a "dummy" file, thereby preventing their being allocated to any other files or used by directories, thus preventing these viruses from inflicting any damage on the files or directories. Some viruses attacked the two sectors of a disk that generally contain the last two sectors of the root directory. Reducing the size of the root directory by two sectors (see Table 1, "Number of entries in root directory" field of the BIOS Parameter Block) prevents this type of attack on the root directory. Preferably, the dummy file includes the first two sectors removed from the root directory, i.e., the first two clusters on the disk after the root directory, and the cluster comprising the last track on the last surface. (Assuming the cluster size is equal to one.) The dummy file, named "ViToler8.(c)", has an entry in the directory and entries, corresponding to the above-listed sectors and clusters, in the FAT. The directory entry marks the file as "hidden" in the MS-DOS sense. MS-DOS does not list hidden files when it provides a directory listing of files, so users will not generally know the file exists. While users can remove the hidden attribute from the file, marking the file hidden reduces the possibility that a user will delete the file and thereby make the virus-targeted clusters and sectors available for allocation to other files.

While I prefer to use a hidden partition to store the anti-virus, disk-maintenance and other software and the BTOS, it is also possible to utilize a disk with no hidden partition and store any of these within the conventional storage capacity of the disk. In such a case, the special bootstrap program causes the computer to execute the anti-virus software or BTOS and then, if the disk is a startup disk, to execute the normal bootstrap program. When the anti-virus, disk-maintenance, or other software or the BTOS is stored within the conventional storage capacity of the disk, its files should be marked as hidden in the MS-DOS sense to reduce the possibility that a user will delete them or that a virus will attack them.

It will therefore be seen that I have developed a virus-tolerant and virus-resistant disk and method of executing software prior to an ultimate operating system, which can be utilized with a variety of anti-virus, disk-maintenance, and other software to address a range of computer viruses. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

```
*******************
* FILE TUNING.INC *
*******************

; TUNING.INC CREATED BY MAKEFILE
DQSector   EQU   016H
DQCylinder EQU   002H
RETRY      EQU   05H

*****************
* FILE BOOT.INC *
*****************

;CORE.INC (tm)
;Copyright(c)1995 OverByte Corporation
;-----------------------------------------------------------------

FARFUN   MACRO   n
n&_funptr        LABEL   DWORD
n&_offset        LABEL   WORD
         DW      OFFSET n
         DW      0
         ENDM ;-----------------------------------------------------------------
; The SLACK macro calculates the space used up by the program
; relative to the space it is permitted to use up.  Ideally this
; should be of size 0.
;-----------------------------------------------------------------
TELLSIZE         MACRO   COUNT,RELATIVE,MAX,MSG
IFDEF MODULENAME
%OUT    %(MODULENAME) &COUNT(dec) RELATIVE than MAX(hex) MSG
ELSE
%OUT    CODE &COUNT(dec) RELATIVE than MAX(hex) MSG
ENDIF
        ENDM SLACK   MACRO   COUNT,MAX,MSG,MN
        LOCAL   diff
IF2
IF ( &COUNT LT 0 ) OR ( &COUNT GT MAX )
diff    EQU     ( 65535 - &COUNT + 1 )
        TELLSIZE %(diff),larger,MAX,MSG
```

```
            .ERR
ELSE
            TELLSIZE COUNT,smaller,MAX,MSG
ENDIF
ENDIF
            ENDM

****************
* FILE: BOOT.ASM *
****************

;BOOT (tm)
;Copyright(c)1995 OverByte Corporation
;------------------------------------------------------------------------

;MODULENAME EQU "BOOT"

INCLUDE BOOT.INC
INCLUDE TUNING.INC

STACK       SEGMENT PARA stack 'STACK'
STACK       ENDS
BOOT        SEGMENT BYTE PUBLIC 'CODE'
            ASSUME  CS:BOOT
            ORG     0
begin:
            JMP SHORT simple
            NOP
            DB      "OverByte"          ; OEM
BPB         DW      200H                ; Bytes per sector
            DB      1                   ; Sectors per cluster
            DW      1                   ; Reserved sectors
            DB      2                   ; Number of FATs
            DW      0E0H                ; Number of ROOT DIR entries
            DW      0B40H               ; Number of sectors on diskette
            DB      0F0H                ; Media Descriptor Byte
            DW      9                   ; Number of sectors per FAT
            DW      12H                 ; Number of sectors per track
            DW      2                   ; Number of heads
            DD      0                   ; Number of hidden sectors
EBPB        DD      0
            DB      0
            DB      0
            DB      0
            DD      0
```

```
            DB       "OverBoot tm"    ; Volume label
            DB       "FAT12    "      ; File system type
            DW       0                ; Leave 2 bytes unused
         ; 64 BYTE mark
simple:     MOV      BX,CS            ; BOOT is always loaded at
                                      ; CS:7C00
            ADD      BX,780H          ; Where at least 1K is free to be
                                      ; used
            MOV      SS,BX            ; at CS:7800 through CS:7C00
            MOV      SP,400H          ; Because the stack will be put
            ADD      BX,40H           ; directly underneath CS:7C00
            PUSH     BX               ; and execution will proceed at
            MOV      BX,OFFSET sevenc ; (CS+7C0):0
            PUSH     BX
            RETF
sevenc:     PUSH     CS               ; Operational DATA is in this
                                      ; segment
            POP      DS
            ASSUME   DS:BOOT
            MOV      myCS,CS          ; Adjust segment so DATA starts
                                      ; at OFFSET 0
            SUB      myCS,7C0H
            MOV      SI,OFFSET worry  ; Message asking wait while
                                      ; DisQuick loads
            CALL     show
            CALL     fast             ; Load DisQuick
            MOV      SI,OFFSET message
            JC       badness          ; If load failed, show Invalid
            MOV      SI,OFFSET diskok ; Otherwise show OK
badness:    CALL     show
            XOR      AX,AX
            INT      16H              ; Wait for a key
            MOV      AX,CS:myCS
            OR       AX,AX            ; Check for segment value
            JZ       reboot
            MOV      AX,4C01H         ; If run from DOS, don't reboot,
                                      ; but EXIT
            INT      21H
            INT      20H
reboot:     MOV      ES,AX
            MOV      WORD PTR ES:[472H],0
            DB       0EAH,0,0,0FFH,0FFH worry       DB       0dh,0ah,"DisQuick(tm) diskette load"
            DB       0dh,0ah,"Please wait.",0
```

```
message  DB      0dh,0ah,"Invalid "
diskok   DB      "DisQuick(tm) diskette"
         DB      0dh,0ah,"Press any key",0
nomem    DB      0dh,0ah,"RAM too small",0
nodsk    DB      0dh,0ah,"DISK failed",0
noapp    DB      0dh,0ah,"Bad DisQuick",0
myNO     DB      0FFH
myCX     DW      (DQSector + ( DQCylinder SHL 8 ) )
myDX     DW      0
myIP     DW      0
myES     DW      0
myCS     DW      0 show     PROC    NEAR
         CLD
more:    LODSB
         OR      AL,AL
         JZ      done
         MOV     AH,0EH    ; Use TTY output in BIOS to show messages
         MOV     BL,0
         INT     10H
         JMP SHORT more
done:    RET
show     ENDP fast     PROC    NEAR
         PUSH    AX
         PUSH    BX
         PUSH    CX
         PUSH    DX
         PUSH    BP
         PUSH    SI
         PUSH    DI
         PUSH    ES MOV     BX,40H
         MOV     ES,BX
         MOV     BX,13H
         MOV     BX,ES:[BX]       ; Ask BIOS how much RAM this PC
                                  ; has
         CMP     BX,1EAH          ; 512K minus a virus or two
         JAE     memok
         MOV     SI,OFFSET nomem  ; Can't load DisQuick if not
                                  ; enough RAM
         CALL    show
```

```
            JMP       ignore memok:      MOV       AX,CS
            ADD       AX,0003FH
            AND       AX,0FFC0H
            ADD       AX,40H
            MOV       ES,AX                   ; align load area at next 1K
                                              ; boundary ASSUME    ES:NOTHING
            MOV       myES,ES next:       MOV       CX,RETRY
again:      PUSH      CX MOV       DX,myDX                 ; Using location of current chunk
                                              ; to load
            MOV       CX,myCX
            XOR       BX,BX
            MOV       AX,202H                 ; Keep loading 1K chunks from
                                              ; hidden partition
            INT       13H POP       CX
            JNC       good
            PUSH      CX
            XOR       AX,AX
            XOR       DX,DX
            INT       13H
            POP       CX
            LOOP      again                   ; Until all of DisQuick is loaded
            MOV       SI,OFFSET nodsk
            CALL      show
            JMP SHORT ignore good:       MOV       DL,myNO
            CMP       DL,0FFH
            JNE       count
            PUSH      BX
            XOR       BX,BX
            MOV       DX,ES:[BX+2]            ; This will be Kilobytes in APP
use:        POP       BX
            MOV       myNO,DL
count:      MOV       DX,myDX                 ; Adjust to location of next
                                              ; chunk to load
            MOV       CX,myCX
```

```
                INC     DH
                AND     DH,1
                JNZ     head
                INC     CH
        head:
                MOV     myCX,CX
                MOV     myDX,DX MOV     AX,ES
                ADD     AX,40H
                MOV     ES,AX
                ASSUME  ES:NOTHING DEC     myNO
                MOV     AL,myNO
                OR      AL,AL
                JNZ     next            ; Go fetch the next chunk ; Launch
                LES     BX,DWORD PTR myIP
                CMP     WORD PTR ES:[BX],002EBH
                JE      launch
                MOV     SI,OFFSET noapp
                CALL    show
                JE      ignore
        launch: PUSH    myCS
                CALL    DWORD PTR myIP  ; Execute DisQuick
                ADD     SP,2
                PUSH    CS
                POP     DS
                ASSUME  DS:BOOT
                CLC
                JMP SHORT success
        ignore: STC
        success:POP     ES
                POP     DI
                POP     SI
                POP     BP
                POP     DX
                POP     CX
                POP     BX
                POP     AX
                RET
        fast    ENDP
        codeend:
```

```
        ORG     1FEH
bootend:
        DW      0AA55H

IF 0
BOOTSIZE EQU ( ( OFFSET CS:bootend ) - ( OFFSET CS:codeend ) )
SLACK %(BOOTSIZE),0200H,"from end of BOOT code to AA55"
ENDIF BOOT    ENDS
        END     begin
```

What is claimed is:

1. A virus-resistant disk for use with a computer, comprising:
   (a) anti-virus software stored on the disk and configured to cause the computer to detect and remove from a component thereof at least one virus; and
   (b) means for causing the computer to execute the anti-virus software upon startup of the computer but before the computer executes an ultimate operating system.

2. The virus-resistant disk defined in claim 1, wherein the execution-causing means comprises bootstrap software stored on the disk, execution of the bootstrap software causing the computer to execute the anti-virus software prior to post-bootstrap operations, the bootstrap software being executed upon startup of the computer.

3. The virus-resistant disk defined in claim 1, wherein:
   (a) the computer comprises memory and registers:
   (b) the computer has an initialization state in which the memory and registers of the computer accurately reflect the amount of memory on the computer and no interrupt vector in the computer contains an address of a routine within a virus; and
   (c) the anti-virus software is configured to cause the computer, after detecting and removing a virus, to enter the initialization state.

4. A virus-resistant disk for use with a computer, comprising:
   (a) a hidden partition comprising storage space inaccessible to conventional programs and not reducing conventional storage capacity of the disk;
   (b) a disk descriptor block describing conventional storage capacity and geometry of the disk but not describing the hidden partition, thereby making the hidden partition inaccessible to conventional programs;
   (c) anti-virus software stored in the hidden partition and configured to cause the computer to detect and remove from a component thereof at least one virus; and
   (d) means for causing the computer to execute the anti-virus software.

5. The virus-resistant disk defined in claim 4, wherein the execution-causing means comprises bootstrap software stored on the disk, execution of the bootstrap software causing the computer to execute the anti-virus software prior to post-bootstrap operations, the bootstrap software being executed upon startup of the computer.

6. The virus-resistant disk defined in claim 4, wherein the anti-virus software comprises at least one anti-virus program and the execution-causing means comprises:
   (d1) bootstrap software stored on the disk; and
   (d2) a bootstrap-time operating system stored in the hidden partition for causing the computer, upon startup, to automatically execute the bootstrap software, execution of the bootstrap software causing the computer to execute the bootstrap-time operating system, execution of the bootstrap-time operating system causing the computer to execute the at least one anti-virus program prior to post-bootstrap operations.

7. The virus-resistant disk defined in claim 6, further comprising:
   (e) disk-maintenance software stored in the hidden partition and configured to cause the computer to detect and repair damage to information stored on a component thereof; and wherein
   (f) the bootstrap-time operating system causes the computer to execute the disk-maintenance software prior to post-bootstrap operations.

8. The virus-resistant disk defined in claim 4, wherein the execution-causing means comprises an application program stored on the disk.

9. The virus-resistant disk defined in claim 4, wherein the disk has a plurality of tracks on each of at least one surface and the hidden partition comprises storage space on fewer than all the tracks.

10. The virus-resistant disk defined in claim 4, wherein the disk has a plurality of tracks on each of at least one surface and the hidden partition comprises storage space on all the tracks.

11. The virus-resistant disk defined in claim 4, wherein:
   (a) the computer comprises memory and registers;
   (b) the computer has an initialization state in which the memory and registers of the computer accurately reflect the amount of memory on the computer and no interrupt vector in the computer contains an address of a routine within a virus; and
   (c) the anti-virus software is configured to cause the computer, after detecting and removing a virus, to enter the initialization state.

12. A method of causing a computer to execute at least one program upon startup of the computer but before the computer executes an ultimate operating system, the method comprising the steps:
   (a) providing a startup disk comprising a hidden partition comprising storage space inaccessible to conventional programs and not reducing conventional storage capacity of the disk;
   (b) providing a bootstrap-time operating system stored in the hidden partition;
   (c) causing the computer to execute the bootstrap-time operating system upon startup of the computer but before the computer executes the ultimate operating system;
   (d) causing the computer to execute the at least one program under the control of the bootstrap-time operating system; and
   (e) upon completion of the at least one program, executing the ultimate operating system.

13. The method defined in claim 12, wherein the at least one program is anti-virus software stored in the hidden partition and configured to cause the computer to detect and remove from a component thereof at least one virus.

14. The method defined in claim 13, wherein:
   (a) the computer comprises memory and registers;
   (b) the computer has an initialization state in which the memory and registers of the computer accurately reflect the amount of memory on the computer and no interrupt vector in the computer contains an address of a routine within a virus; and
   (c) the anti-virus software is configured to cause the computer, after detecting and removing a virus, to enter the initialization state.

15. The method defined in claim 12, wherein the at least one program is disk-maintenance software stored in the hidden partition and configured to cause the computer to detect and repair damage to information stored on a component thereof.

16. A virus-tolerant disk having sectors and a file system allocation table for allocating the sectors to files, the virus-tolerant disk comprising:
   (a) a predetermined subset of the sectors, comprising sectors attacked by at least one virus; and
   (b) entries, corresponding to the predetermined sectors, in the file system allocation table for making the predetermined sectors unavailable for allocation to any file, the entries being made prior to an attack by a virus.

* * * * *